(12) United States Patent
Hirota

(10) Patent No.: US 7,040,595 B2
(45) Date of Patent: May 9, 2006

(54) CONSTANT FLOW RATE EXPANSION VALVE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 164 days.

(21) Appl. No.: 10/617,741

(22) Filed: Jul. 14, 2003

(65) Prior Publication Data

US 2004/0011980 A1      Jan. 22, 2004

(30) Foreign Application Priority Data

Jul. 16, 2002   (JP)   .............................. 2002-206596
Jan. 28, 2003   (JP)   .............................. 2003-018455

(51) Int. Cl.
*F16K 31/02*   (2006.01)

(52) U.S. Cl. ............................................... 251/129.07

(58) Field of Classification Search .. 251/30.01–30.05, 251/129.08; 62/204, 222, 223, 224
See application file for complete search history.

(56) References Cited

U.S. PATENT DOCUMENTS

| | | | |
|---|---|---|---|
| 2,417,994 A * | 3/1947 | Sheets | 251/24 |
| 2,477,897 A * | 8/1949 | Ray | 251/30.01 |
| 4,717,116 A * | 1/1988 | Ishigaki | 251/30.02 |
| 5,117,647 A | 6/1992 | Valbjorn | |
| 5,901,742 A * | 5/1999 | Kleppner et al. | 137/508 |
| 6,422,308 B1 * | 7/2002 | Okawara et al. | 165/202 |
| 6,658,877 B1 * | 12/2003 | Kjøng-Rasmussen | 62/222 |
| 2002/0053652 A1 | 5/2002 | Freisinger et al. | |

FOREIGN PATENT DOCUMENTS

JP   2001/153495   6/2001

OTHER PUBLICATIONS

Patent Abstracts of Japan, Publication No. 2001-153495, dated Jun. 8, 2001/Discussed in the specification.

* cited by examiner

*Primary Examiner*—Justine R. Yu
*Assistant Examiner*—Huyen Le
(74) *Attorney, Agent, or Firm*—Westerman, Hattori, Daniels & Adrian, LLP

(57) ABSTRACT

A constant flow rate expansion valve includes a refrigerant passage having a fixed flow path cross-sectional area smaller than that of a refrigerant inlet, a differential pressure control valve for controlling the differential pressure (P1–P2) between an inlet pressure P1 and an intermediate pressure P2 generated by refrigerant flowing through the refrigerant passage to be constant, and a solenoid capable of setting the differential pressure by the value of an electric current externally supplied. In the differential pressure control valve, a piston and a valve element integrally formed with each other sense the differential pressure (P1–P2), change a gap between the valve element and a valve seat such that the differential pressure is held constant, and adiabatically expand the refrigerant at the gap.

24 Claims, 11 Drawing Sheets

CONSTANT FLOW RATE EXPANSION VALVE

CROSS-REFERENCES TO RELATED APPLICATIONS, IF ANY

This application claims priority of Japanese Applications No.2002-206596 filed on Jul. 16, 2002, entitled "Constant Flow Rate Expansion Valve" and No. 2003-018455 filed on Jan. 28, 2003, entitled "Constant Flow Rate Expansion Valve".

BACKGROUND OF THE INVENTION (1) Field of the Invention

This invention relates to a constant flow rate expansion valve, and more particularly to a constant flow rate expansion valve for a refrigeration cycle of an automotive air conditioner, for changing high-temperature and high-pressure refrigerant into low-temperature and low-pressure refrigerant to deliver the resulting refrigerant to an evaporator at a constant flow rate.

(2) Description of the Related Art

In a refrigeration cycle of an automotive air conditioner, when a differential pressure control valve for providing control such that the differential pressure across a compressor or the suction pressure is constant is used for a control valve for controlling the compressor, to stabilize controllability of the system, it is considered to be desirable to use a constant flow rate expansion valve different in control method, for an expansion valve. A constant flow rate expansion valve of this kind is known e.g. from Japanese Unexamined Patent Publication No. 2001-153495.

The constant flow rate expansion valve includes a constant flow rate mechanism which is based on a principle that if the cross-sectional area of a passage through which refrigerant flows between a refrigerant inlet and a refrigerant outlet, and a differential pressure across the passage are determined, it is possible to make constant the flow rate of refrigerant flowing through the expansion valve, and control the flow rate to a constant flow rate corresponding to a value set by a solenoid by varying one of the cross-sectional area and the differential pressure by the solenoid. More specifically, the constant flow rate mechanism includes a flow path cross-sectional area control valve for controlling the cross-sectional area of a passage, and a constant differential pressure valve for making constant the differential pressure between the inlet and outlet of the flow path cross-sectional area control valve, and controls the flow path cross-sectional area of the flow path cross-sectional area control valve by a solenoid, to thereby hold the flow rate of refrigerant flowing through the expansion valve at a predetermined constant flow rate corresponding to the flow path cross-sectional area set by the solenoid (see FIG. 1 in Japanese Unexamined Patent Publication No. 2001-153495). Alternatively, the constant flow rate mechanism includes a restriction passage having a fixed cross-sectional area, and a differential pressure control valve for making constant the differential pressure between the inlet and outlet of the restriction passage, and controls the differential pressure set to the differential pressure control valve by a solenoid, to thereby hold the flow rate of refrigerant flowing through the expansion valve at a predetermined constant flow rate corresponding to the differential pressure set by the solenoid (see FIG. 2 of Japanese Unexamined Patent Publication No. 2001-153495).

In the conventional constant flow rate expansion valve, however, the type of controlling the flow path cross-sectional area is configured such that a pressure-sensing section of the constant differential pressure valve slides between the refrigerant inlet and the refrigerant outlet so as to be able to open and close the constant differential pressure valve by sensing an intermediate pressure between the constant differential pressure valve and the flow path cross-sectional area control valve, and a pressure at the outlet. Further, the type of controlling the differential pressure is also configured such that a pressure-sensing section of the differential pressure control valve slides between the refrigerant inlet and the refrigerant outlet so as to be able to open and close the differential pressure control valve, by sensing an intermediate pressure between the differential pressure control valve and the restriction passage, and a pressure at the outlet. Therefore, in both of the types, there occurs leakage of refrigerant from the refrigerant inlet to the refrigerant outlet through respective sliding portions, and it is difficult, for example, to control the flow rate of refrigerant substantially to zero, even if the control of the flow rate to zero is attempted.

SUMMARY OF THE INVENTION

The present invention has been made in view of the above circumstances, and an object thereof is to provide a constant flow rate expansion valve which is sufficiently reduced in leakage of refrigerant.

To solve the above problem, the present invention provides a constant flow rate expansion valve including a restriction having a flow path cross-sectional area smaller than that of a refrigerant inlet, and a differential pressure control valve for providing control such that a differential pressure across the restriction is constant, characterized in that a downstream side of the restriction and an upstream side of the differential pressure control valve are communicated with each other, and that the differential pressure control valve is configured to receive an inlet pressure of the refrigerant inlet in a valve-closing direction and at the same time receive an intermediate pressure between the restriction and the differential pressure control valve in a valve-opening direction, with a pressure-receiving portion for receiving the inlet pressure being fluidly isolated by a diaphragm.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will be described in detail with reference to the drawings.

Figure 1:
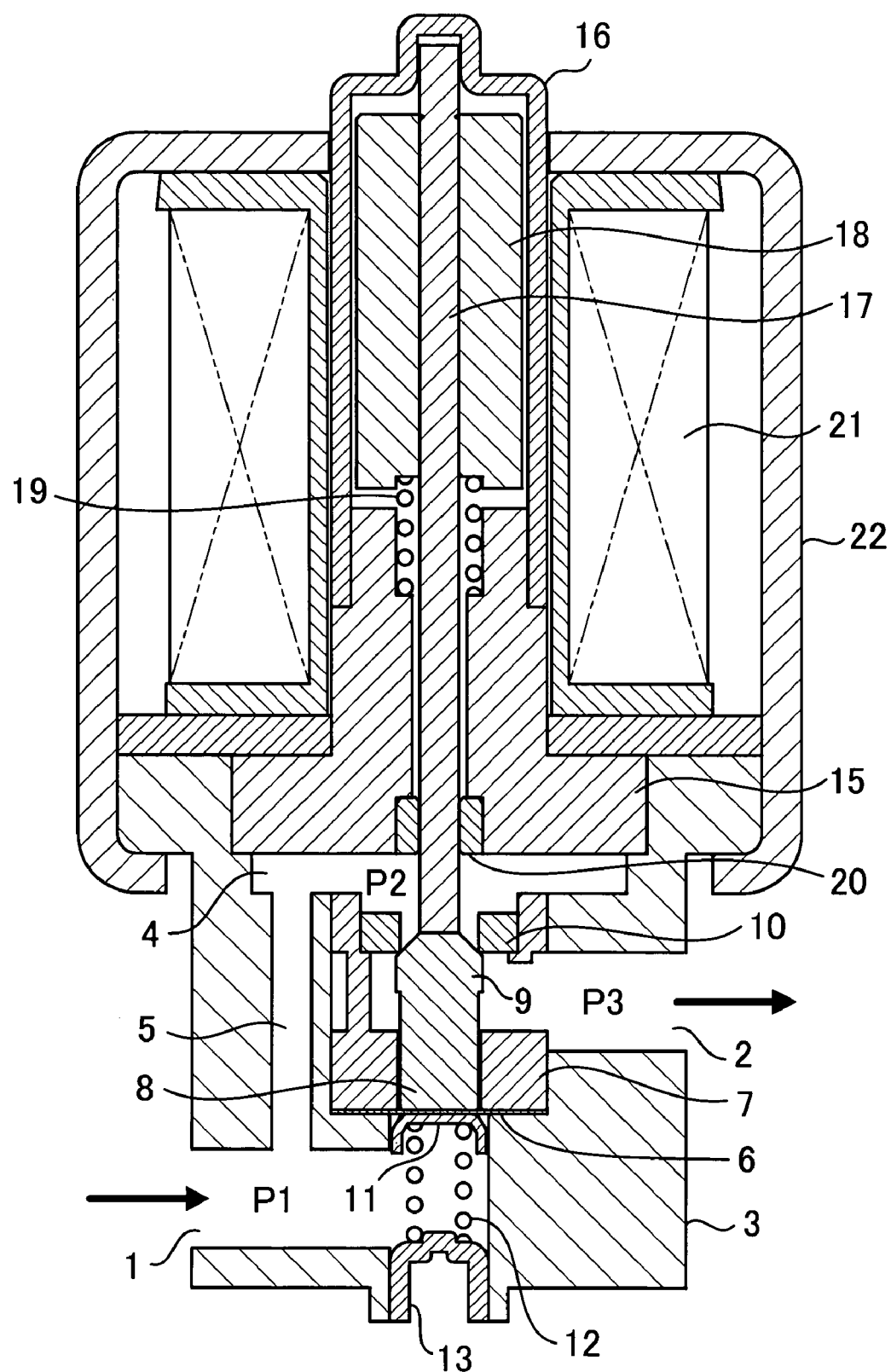
FIG. 1 is a central longitudinal cross-sectional view showing a constant flow rate expansion valve according to a first embodiment of the invention.

FIG. 1 is a central longitudinal cross-sectional view showing a constant flow rate expansion valve according to a first embodiment of the invention.

In the constant flow rate expansion valve, a refrigerant inlet 1 into which high-pressure refrigerant is sent, and a refrigerant outlet 2 from which the refrigerant is sent out to an evaporator, not shown, while being expanded, are provided in a main block 3. Between the refrigerant inlet 1 and an intermediate chamber 4 formed on top of the main block 3, there is formed a refrigerant passage 5, which has a smaller flow path cross-sectional area than that of the refrigerant inlet 1 to form a restriction (orifice) for generating a differential pressure dependent on the flow rate of refrigerant thereacross.

The main block 3 has a through hole axially formed therethrough with a stepped portion. A diaphragm 6 is disposed at the stepped portion in a large-diameter part of the through hole, and a valve holder 7 is press-fit into the large-diameter part so as to fix the diaphragm 6. The valve holder 7 axially movably holds a piston 8. The piston 8 has a valve element 9 having a frustoconical shape and integrally formed with the piston 8 at the top thereof as viewed in the figure. In an upper opening of the valve holder 7, a valve seat 10 associated with the valve element 9 is fixedly disposed by press-fitting. The valve seat 10 has a valve hole formed to have an inner diameter identical in size to the outer diameter of the piston 8, whereby pressure of the refrigerant outlet 2 applied onto the diaphragm 6, the piston 8, and the valve element 9 are canceled out so as to prevent the pressure from the refrigerant outlet 2 from adversely affecting the motions of the piston 8 and the valve element 9. Further, in a portion where the piston 8 and the valve element 9 moving forward and backward in a manner sensitive to a differential pressure between the refrigerant inlet 1 and the refrigerant outlet 2 are arranged, the provision of the diaphragm 6 completely cuts off the refrigerant inlet 1 and the refrigerant outlet 2 from each other, so that it is possible to make this portion completely free from leakage of refrigerant.

The diaphragm 6 has an underside surface in abutment with a diaphragm-receiving disc 11, and the valve element 9 is urged by a spring 12 in a direction in which the valve element 9 is seated on the valve seat 10. The spring 12 has a lower end thereof received by a press-fit member 13 press-fit into the main block 3.

It should be noted that preferably, a polyimide film having a thickness of approximately 75 μm, which is high in tensile strength, is used as the diaphragm 6. In this case, a plurality of thinner polyimide films may be used in a state overlaid upon each other so as to improve the tensile strength without increasing rigidity thereof.

A solenoid section is provided on top of the main block 3. The solenoid section includes a fixed core 15 fit in the upper portion of the main block 3. After the fixed core 15 has been fit, sealing is provided by welding for prevention of leakage of refrigerant therefrom. The top of the fixed core 15 is capped with a casing 16, and the capped portion as well is sealed by welding such that the inside of the solenoid section becomes completely gastight. The casing 16 includes a shaft 17 extending axially, a movable core 18 fixed to the shaft 17, and a spring 19 disposed between the movable core 18 and the fixed core 15. The shaft 17 is axially movably held by a bearing formed at an upper end portion of the casing 16 and a bearing 20 press-fit into a lower end face of the fixed core 15. A solenoid coil 21 is arranged around the upper portion of the fixed core 15 and the casing 16, and fixed to the main block 3 by a yoke 22.

In the constant flow rate expansion valve constructed as above, when the solenoid coil 21 is not supplied with an electric current, the movable core 18 is urged by the spring 19 in a direction away from the fixed core 15, and hence the solenoid force applied to the valve element 9 is zero. At this time, since the piston 8 is urged by the spring 12, the valve element 9 is seated on the valve seat 10 to place the constant flow rate expansion valve in a fully-closed state.

Now, if an electric current i is supplied to the solenoid coil 21, the movable core 18 is attracted toward the fixed core 15, whereby a solenoid force corresponding to the attraction is applied to the valve element 9, and the valve element 9 is made stationary in a position where the solenoid force and the load of the spring 12 are balanced. In this state, when high-pressure refrigerant is introduced into the refrigerant inlet 1, the refrigerant passes through the refrigerant passage 5 forming the restriction, and enters the intermediate chamber 4, from which the refrigerant flows out into the refrigerant outlet 2 while being adiabatically expanded through a gap formed between the valve element 9 and the valve seat 10.

Now, let it be assumed that a pressure of the refrigerant introduced into the refrigerant inlet 1 is represented by P1, a pressure of the refrigerant in the intermediate chamber 4, which is reduced due to the refrigerant having passed through the refrigerant passage 5, is represented by P2, and the flow path cross-sectional area of the refrigerant passage 5 is represented by A. Then, a flow rate Gf of the refrigerant flowing through the constant flow rate expansion valve is represented by the following equation:

$$Gf = KA(P1-P2) \qquad (1)$$

In the above equation, K represents a flow coefficient of the refrigerant. On the other hand, assuming that an effective pressure-receiving area of the diaphragm 6, the piston 8, and the valve element 9 is represented by B, a solenoid force produced by the electric current i is represented by f(i), and the load of the spring 12 is represented by fs, the relationship between forces acting on the piston 8 and the valve element 9 in respective upward and downward directions is represented by the following equation:

$$B \cdot P1 + fs = B \cdot P2 + f(i) \qquad (2)$$

From this equation (2), a force applied to the valve element 9 is represented by the following equation:

$$B(P1-P2)=f(i)-fs \quad (3)$$

From the equations (1) and (3), the flow rate Gf of the refrigerant is represented by the following equation:

$$Gf=K(A/B)(f(i)-fs) \quad (4)$$

This means that on the right side of the above equation (4), parameters other than the solenoid force f(i) are fixed values, and hence the flow rate Gf becomes a constant flow rate proportional to the electric current i supplied to the solenoid coil 21.

Next, the operation of the constant flow rate expansion valve will be described in detail with reference to flow rate characteristics thereof shown in FIG. 2.

Figure 2:
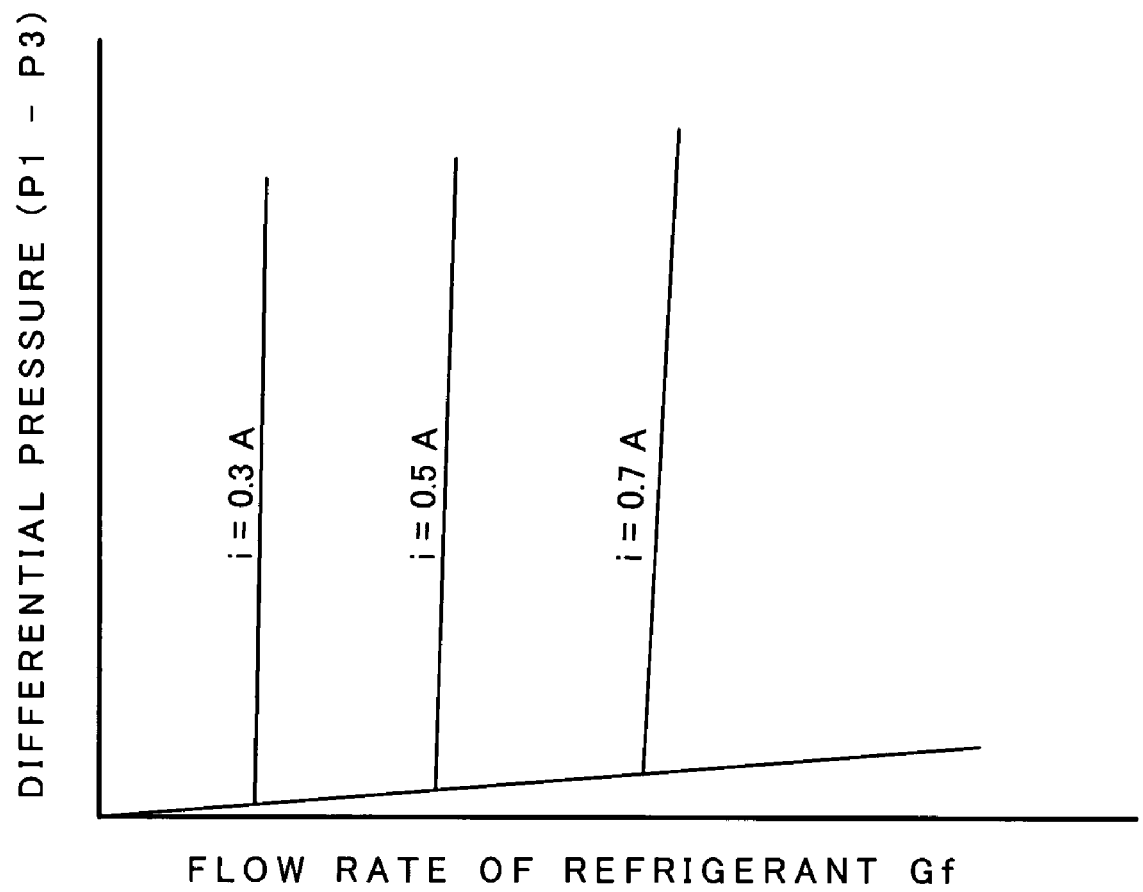
FIG. 2 is a diagram showing flow rate characteristics of the constant flow rate expansion valve according to the first embodiment.

FIG. 2 is a diagram showing the flow rate characteristics of the constant flow rate expansion valve according to the first embodiment.

In the flow rate characteristics, the abscissa represents the flow rate of refrigerant, and the ordinate represents the differential pressure between the pressure P1 at the refrigerant inlet 1 and the pressure P3 at the refrigerant outlet 2. When the electric current i supplied to the solenoid coil 21 is zero, the valve element 9 is seated on the valve seat 10 by the load fs of the spring 12, whereby the constant flow rate expansion valve is fully closed, so that the flow rate Gf is zero.

When e.g. 0.3 ampere of electric current i is supplied to the solenoid coil 21, to apply the solenoid force f(i) larger than the load fs of the spring 12 to the valve element 9, the valve element 9 is instantly moved from a seating position thereof to a position where the solenoid force f(i) and the load of the spring 12 are balanced, and becomes stationary thereat. Due to the valve element 9 being moved away from the valve seat 10, refrigerant starts to flow. The flow of the refrigerant generates a differential pressure (P1-P2) across the refrigerant passage 5. The differential pressure (P1-P2) is applied to the diaphragm 6 and the valve element 9 in a direction of pressing them against each other. The differential pressure increases as the flow rate of the refrigerant increases. When the flow rate of the refrigerant progressively increases to a certain flow rate, and attempts to exceed the certain flow rate, the differential pressure (P1-P2) acts on the diaphragm 6 and the valve element 9 to urge the valve element 9 toward the valve seat 10, that is, in a direction of reducing the flow rate of the refrigerant. Inversely, when the flow rate of the refrigerant becomes smaller than the certain flow rate, the differential pressure (P1-P2) also decreases, so that the differential pressure (P1-P2) acts on the valve element 9 to urge the same in the valve-opening direction to increase the flow rate. As a result, the constant flow rate expansion valve is capable of causing refrigerant to flow at a constant flow rate dependent on the electric current i supplied to the solenoid coil 21.

Figure 3:
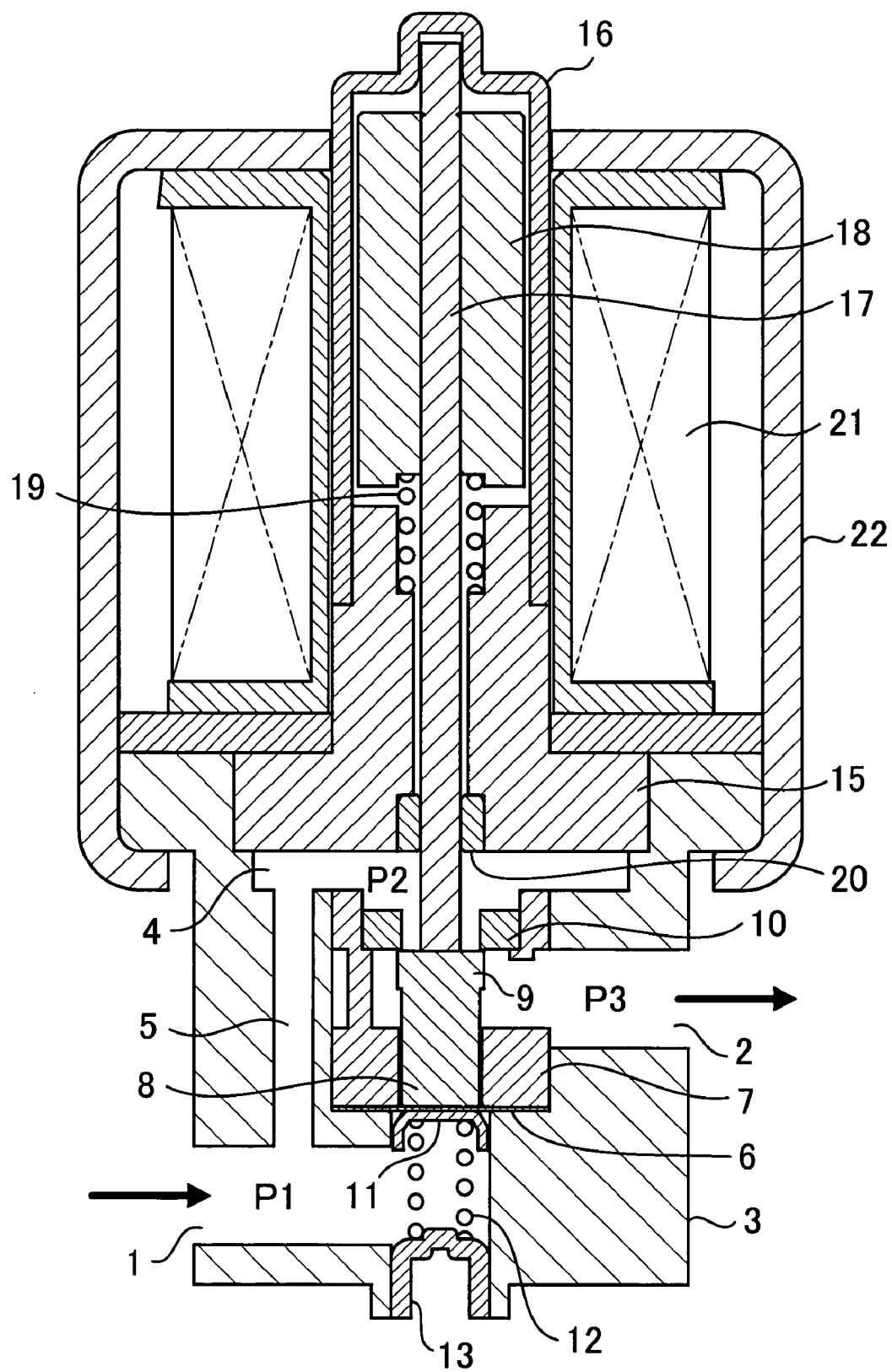
FIG. 3 is a central longitudinal cross-sectional view showing a constant flow rate expansion valve according to a second embodiment of the invention.

FIG. 3 is a central longitudinal cross-sectional view showing a constant flow rate expansion valve according to a second embodiment of the invention. It should be noted that in FIG. 3, component elements identical to or equivalent to those shown in FIG. 1 are designated by identical reference numerals, and detailed description thereof is omitted.

The constant flow rate expansion valve according to the second embodiment is configured to have a flat valve configuration in which a valve element 9 integrally formed with a piston 8 has a flat seating surface via which it is seated on a valve seat 10. As to the remainder, this constant flow rate expansion valve has the same construction as that of the constant flow rate expansion valve according to the first embodiment, and hence operates similarly thereto.

Figure 4:
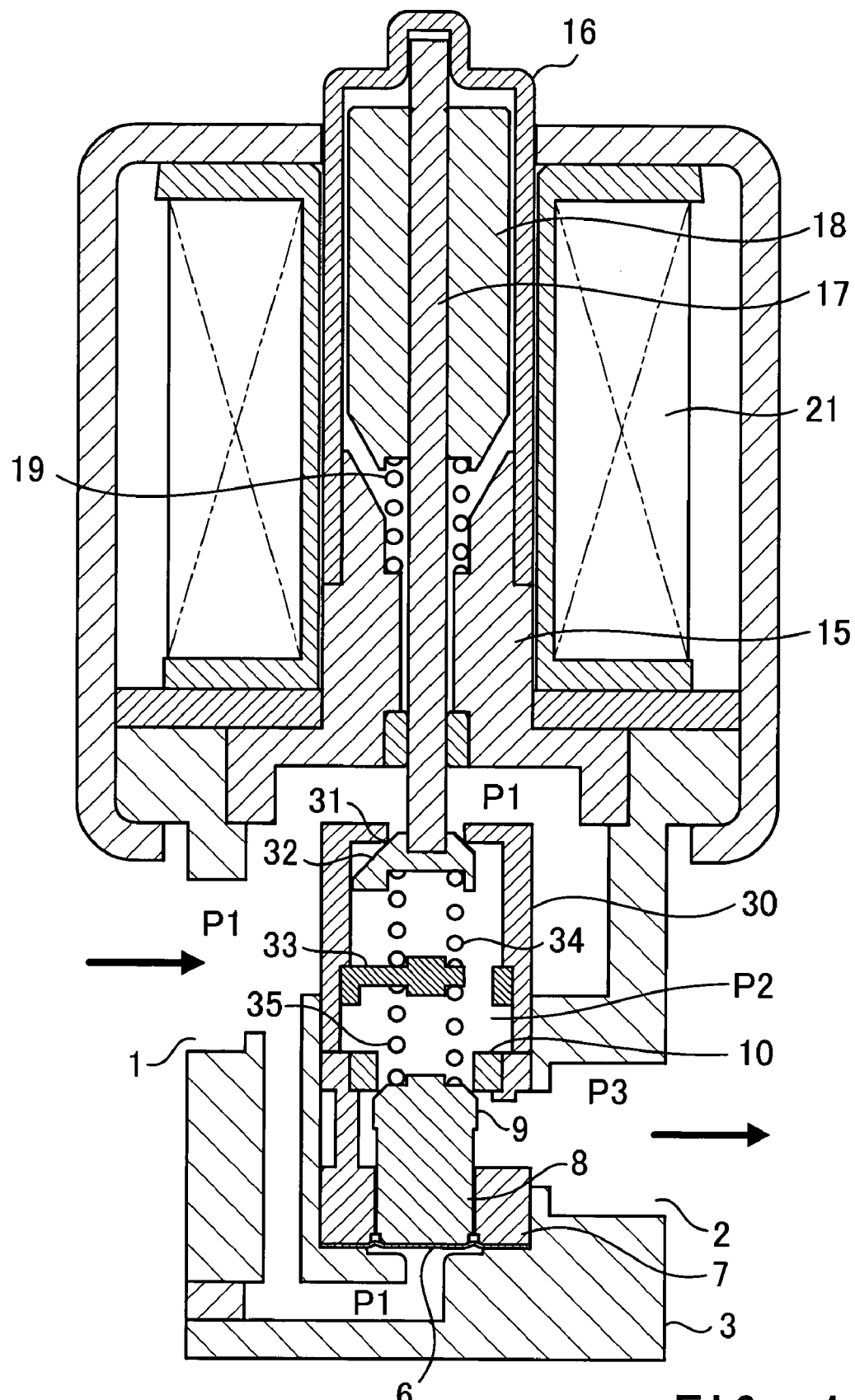
FIG. 4 is a central longitudinal cross-sectional view showing a constant flow rate expansion valve according to a third embodiment of the invention.

FIG. 4 is a central longitudinal cross-sectional view showing a constant flow rate expansion valve according to a third embodiment of the invention. It should be noted that in FIG. 4, component elements identical to or equivalent to those shown in FIG. 1 are designated by identical reference numerals, and detailed description thereof is omitted.

The constant flow rate expansion valve according to the third embodiment is distinguished from the constant flow rate expansion valves according to the first and second embodiments, each of which is configured to have a constant flow rate mechanism including the refrigerant passage 5 having a fixed flow path cross-sectional area and operating such that the differential pressure across the refrigerant passage 5 made variable depending on the value of the electric current i supplied to the solenoid coil 21, in that the present constant flow rate expansion valve has a constant flow rate mechanism which is capable of changing the flow path cross-sectional area in dependence on the value of the electric current i, to thereby providing control such that the differential pressure across the expansion valve is made constant.

The constant flow rate expansion valve has a valve housing 30 fixed in a space above a valve seat 10. The valve housing 30 has an opening in the center of the top thereof, which forms a valve hole, with an inner periphery of the opening forming a valve seat 31. A flow path cross-sectional area control valve element 32 is disposed in a manner opposed to the valve seat 31 such that the control valve element 32 can move to and away from the valve seat 31 from the downstream side of the valve seat, to thereby form a restriction capable of changing the flow path cross-sectional area thereof. The valve housing 30 also has a partition wall 33 having a refrigerant passage hole, at an intermediate location. Between the flow path cross-sectional area control valve element 32 and the partition wall 33 is disposed a spring 34 for urging the control valve element 32 in a direction of seating the control valve element 32 on the valve seat 31. A shaft of a solenoid section, extending through the opening formed in the top of the valve housing 30, has a lower end thereof loosely inserted into the control valve element 32. Therefore, when a solenoid coil 21 is not supplied with an electric current, and hence no refrigerant is flowing through the constant flow rate expansion valve, a movable core 18 and the shaft 17 are pulled upward, as viewed in the figure, by a spring 19 of the solenoid section, so that the flow path cross-sectional area control valve element 32 is disconnected from the solenoid section. On the other hand, since the control valve element 32 is pushed upward from below, this valve for controlling the flow path cross-sectional area is in a fully-closed state.

Further, between the partition wall 33 within the valve housing 30 and a valve element 9, there is provided a spring 35 for urging the valve element 9 in a direction in which the valve element 9 moves away from the valve seat 10. Accordingly, when the solenoid coil 21 is not supplied with an electric current, the valve element 9 is pushed downward by the spring 35, and moved away from valve seat 10, so that the valve for carrying out throttle expansion is in a fully-opened state.

Further, assuming that an effective pressure-receiving area of the flow path cross-sectional area control valve element 32 is represented by A, a load set to the spring 34 is represented by f1, an effective pressure-receiving area of the valve element 9 and a diaphragm 6 is represented by B, and a load set to the spring 35 is represented by f2, when a certain electric current i is supplied to the solenoid coil 21 to apply a solenoid force f(i) to the flow path cross-sectional area control valve element 32, thereby causing refrigerant to flow at a certain flow rate, a pressure P1 is applied to the upstream side of the control valve element 32 and the diaphragm 6, and an intermediate pressure within the valve housing 30 is equal to P2. Therefore, the relationship between forces acting on the control valve element 32 in respective upward and downward directions is represented by the following equation:

$$A \cdot P1 + f(i) = A \cdot P2 + f1 \quad (5)$$

From this equation (5), there is obtained the following equation:

$$P1 - P2 = (f1 - f(i))/A \quad (6)$$

On the other hand, the relationship between forces acting on the valve element 9 in respective upward and downward directions is represented by the following equation:

$$B \cdot P1 = B \cdot P2 + f2 \quad (7)$$

From this equation (7), there is obtained the following equation:

$$P1 - P2 = f2/B \quad (8)$$

Consequently, from the equation (6) and the equation (8), there is obtained the following relationship:

$$(f1 - f(i))/A = f2/B \quad (9)$$

This equation (9) holds when a certain electric current i is supplied to the solenoid coil 21, thereby causing refrigerant to flow. It is desired that the constant flow rate expansion valve is fully closed when the electric current ceases to flow, and hence in order to fully close the valve when the electric current i is reduced to zero, the expansion valve is designed such that the effective pressure-receiving area A of the flow path cross-sectional area control valve element 32, the load f1 set to the spring 34, the effective pressure-receiving area B of the valve element 9 and the diaphragm 6, and the load f2 set to the spring 35 satisfy the following condition:

$$f1/A > f2/B \quad (10)$$

According to the condition for fully closing the constant flow rate expansion valve, when the electric current i is reduced to zero, the differential pressure required for opening the flow path cross-sectional area control valve element 32 can be made larger than a pressure required for closing the valve element 9, so that it is possible to fully close the flow path cross-sectional area control valve element 32 out of the valve element 32 and the valve element 9 to which is applied the same differential pressure (P1−P2) during the flow of the refrigerant.

Figure 5:
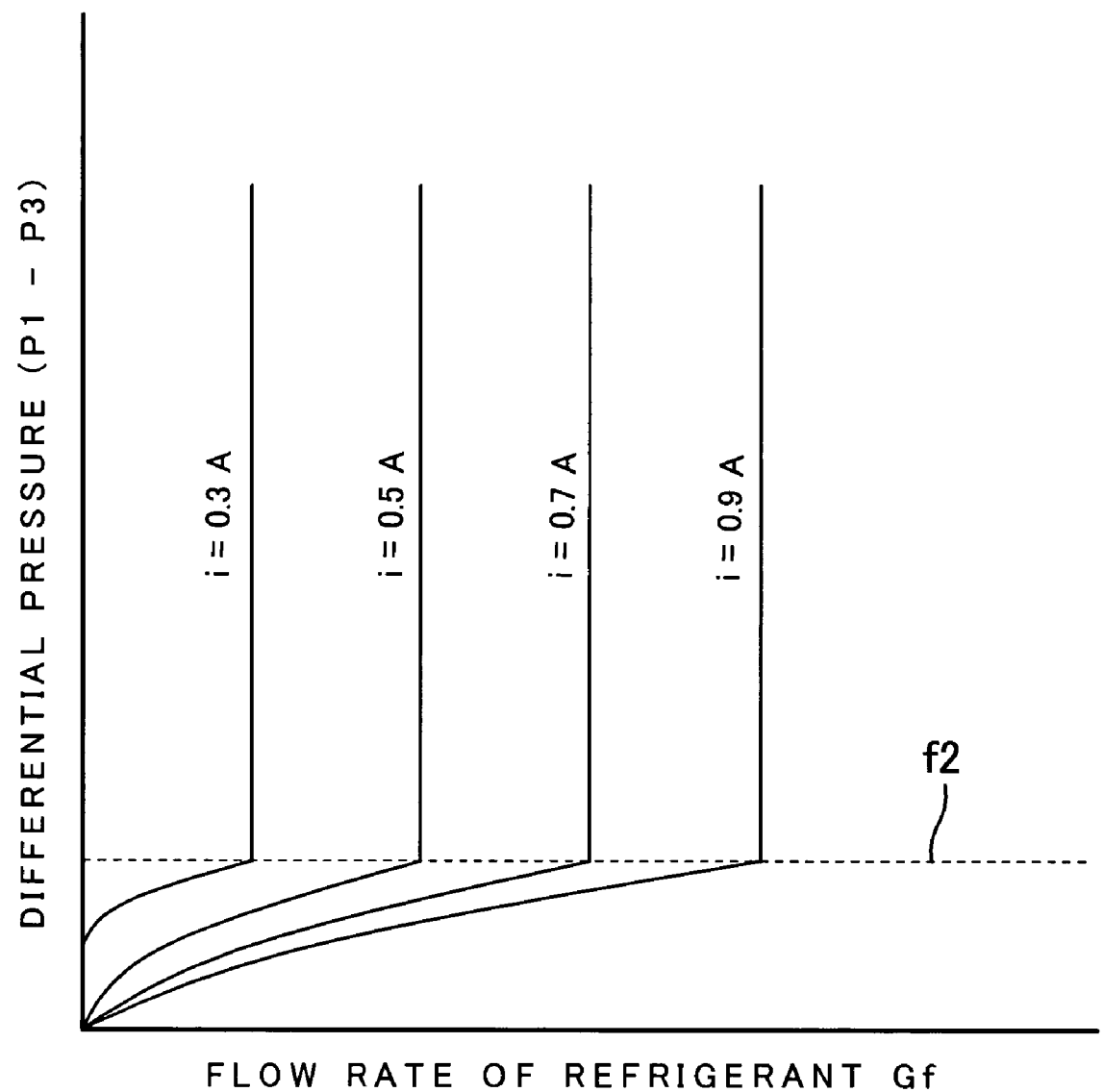
FIG. 5 is a diagram showing flow rate characteristics of the constant flow rate expansion valve according to the third embodiment.

FIG. 5 is a diagram showing the flow rate characteristics of the constant flow rate expansion valve according to the third embodiment. In the flow rate characteristics, the abscissa represents the flow rate of refrigerant, and the ordinate represents the differential pressure between the pressure P1 at a refrigerant inlet 1 and the pressure P3 at a refrigerant outlet 2. When the electric current i supplied to the solenoid coil 21 is zero, the flow path cross-sectional area control valve element 32 is seated on the valve seat 31 associated therewith by the load f1 of the spring 34 to thereby fully close the constant flow rate expansion valve, so that the flow rate Gf is zero.

When e.g. 0.3 ampere of electric current i is supplied to the solenoid coil 21, thereby applying the solenoid force f(i) larger than the load f1 set to the spring 34 to the flow path cross-sectional area control valve element 32, the control valve element 32 is instantly moved from a seating position thereof to a position where the solenoid force f(i) and the load of the spring 12 are balanced, and made stationary thereat. Due to the control valve element 32 being moved away from the valve seat 31 associated therewith, refrigerant starts to flow. First, as the flow rate of the refrigerant increases, the differential pressure between the pressure P1 at the refrigerant inlet 1 and the pressure P3 at the refrigerant outlet 2 also progressively increases. The flow of the refrigerant generates a differential pressure (P1−P2) across the flow path cross-sectional area control valve element 32.

The differential pressure (P1−P2) is applied to the diaphragm 6 and the valve element 9 in the direction of pressing them against each other. The differential pressure increases as the flow rate of the refrigerant increases. When the flow rate of the refrigerant continues to increase progressively, causing the differential pressure (P1−P2) to reach a broken line f2, shown in FIG. 5, then, the constant flow rate expansion valve starts constant flow rate control. Now, the broken line f2 represents the load f2 set to the spring 35. More specifically, the diaphragm 6 and the valve element 9 sense the pressures P1, P2, whereby when the differential pressure (P1−P2) between the pressures P1, P2 attempts to increase, the constant flow rate expansion valve moves the valve element 9 in the valve-closing direction thereof, whereas when the differential pressure (P1−P2) attempts to decrease, the constant flow rate expansion valve moves the valve element 9 in the valve-opening direction thereof, whereby the constant flow rate expansion valve provides control such that the differential pressure (P1−P2) is made constant. As a result, the constant flow rate expansion valve can cause refrigerant to flow at a fixed flow rate set depending on the electric current i supplied to the solenoid coil 21, when the flow rate of the refrigerant becomes equal to or higher than a certain value.

Figure 6:
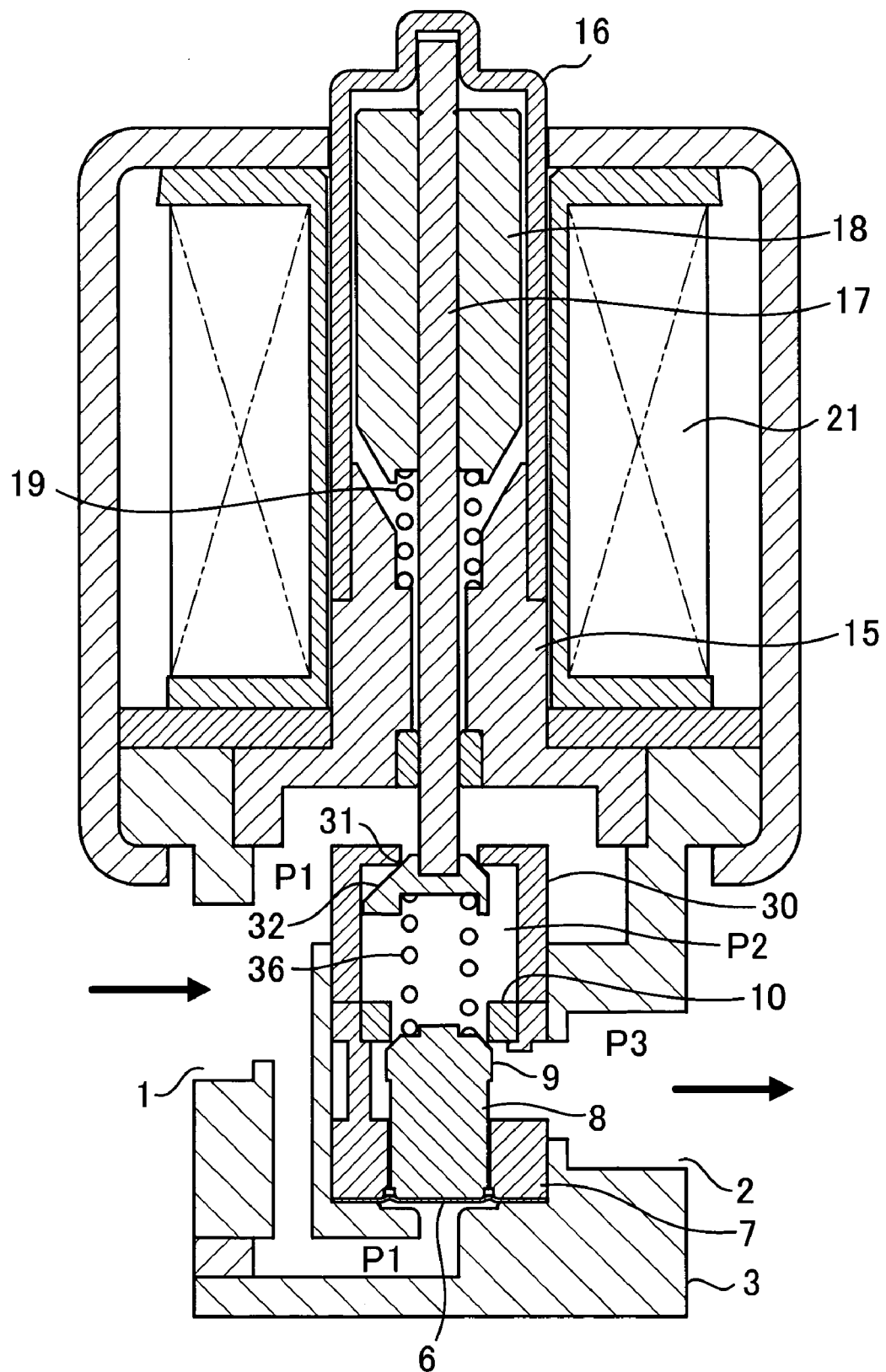
FIG. 6 is a central longitudinal cross-sectional view showing a constant flow rate expansion valve according to a fourth embodiment of the invention.
Figure 7:
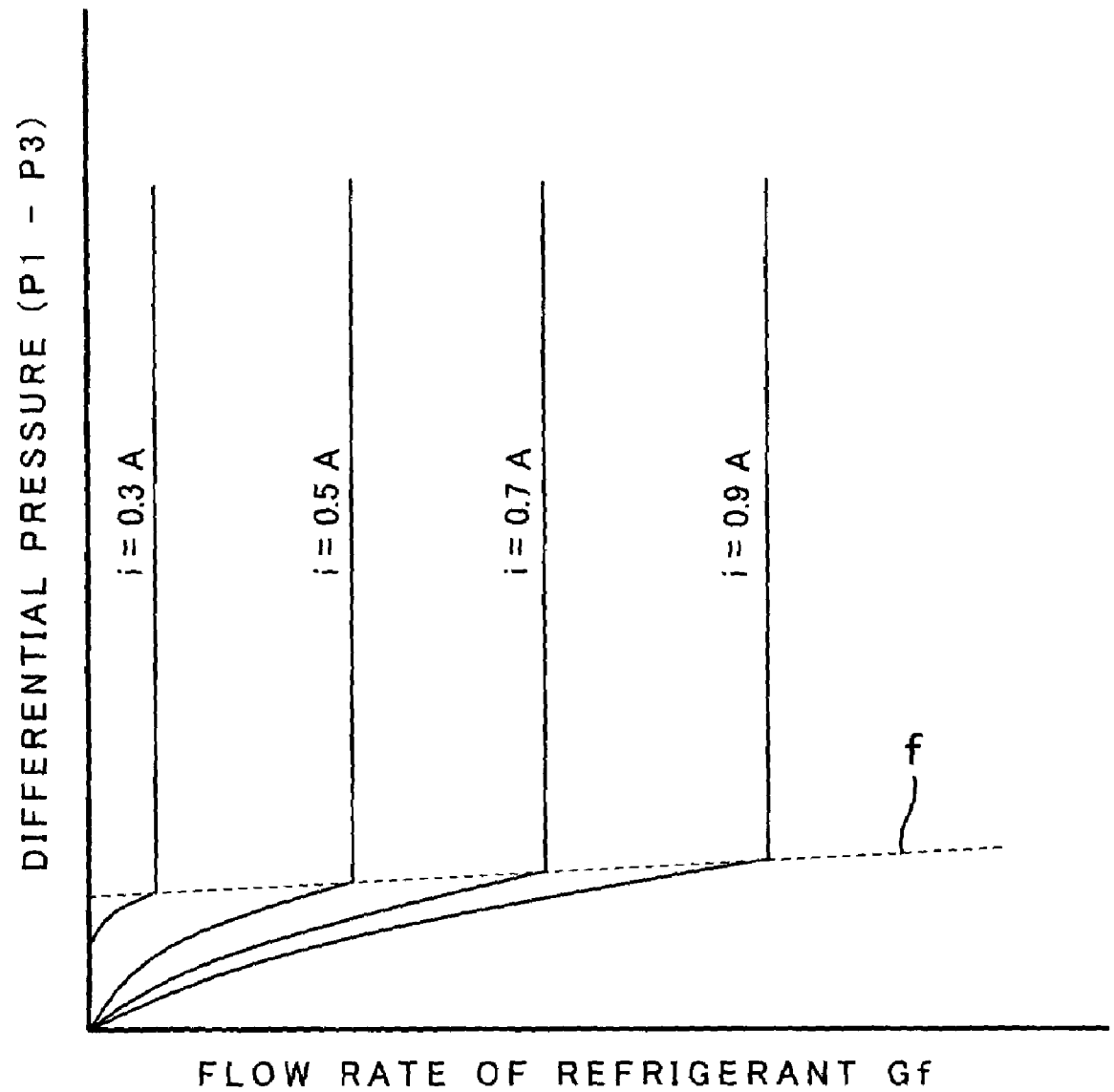
FIG. 7 is a diagram showing flow rate characteristics of the constant flow rate expansion valve according to the fourth embodiment.

FIG. 6 is a central longitudinal cross-sectional view showing a constant flow rate expansion valve according to a fourth embodiment of the invention. FIG. 7 is a diagram showing the flow rate characteristics of the constant flow rate expansion valve according to the fourth embodiment. It should be noted that in FIG. 6, component elements identical to or equivalent to those shown in FIG. 4 are designated by identical reference numerals, and detailed description thereof is omitted.

Similarly to the constant flow rate expansion valve according to the third embodiment, the constant flow rate expansion valve according to the fourth embodiment is configured to have a constant flow rate mechanism which is capable of changing the cross-sectional area of a refrigerant passage depending on the value of an electric current i, thereby providing control such that the differential pressure across the expansion valve is made constant.

The constant flow rate expansion valve has a valve housing 30 having a spring 36 disposed between a flow path cross-sectional area control valve element 32 and a valve element 9. The spring 36 causes the flow path cross-sectional area control valve element 32 to be seated on a valve seat 31 associated therewith, and at the same time urges the valve element 9 in a direction in which the valve element 9 moves away from a valve seat 10 associated therewith.

In this constant flow rate expansion valve as well, the flow path cross-sectional area is set depending on the value of an electric current i supplied to a solenoid coil 21, and the differential pressure (P1−P2) across the expansion valve is controlled by the valve element 9, a piston 8, and a diaphragm 6, such that the differential pressure (P1−P2)

becomes constant, thereby providing control such that the flow rate of refrigerant is made constant. In this embodiment, however, the load f of the spring 36 is changed due to a change in the axial position of the flow path cross-sectional area control valve element 32 which is moved according to the value of the electric current i supplied to the solenoid coil 21. Therefore, the constant flow rate expansion valve has the flow rate characteristics, as illustrated in FIG. 7, in which a broken line f plotting positions where the constant flow rate expansion valve starts constant flow rate control slightly rises from left to right. This is because as the electric current i supplied to the solenoid coil 21 is increased, the amount of compression of the spring 36 by the control valve element 32 increases to increase the load f.

Figure 8:
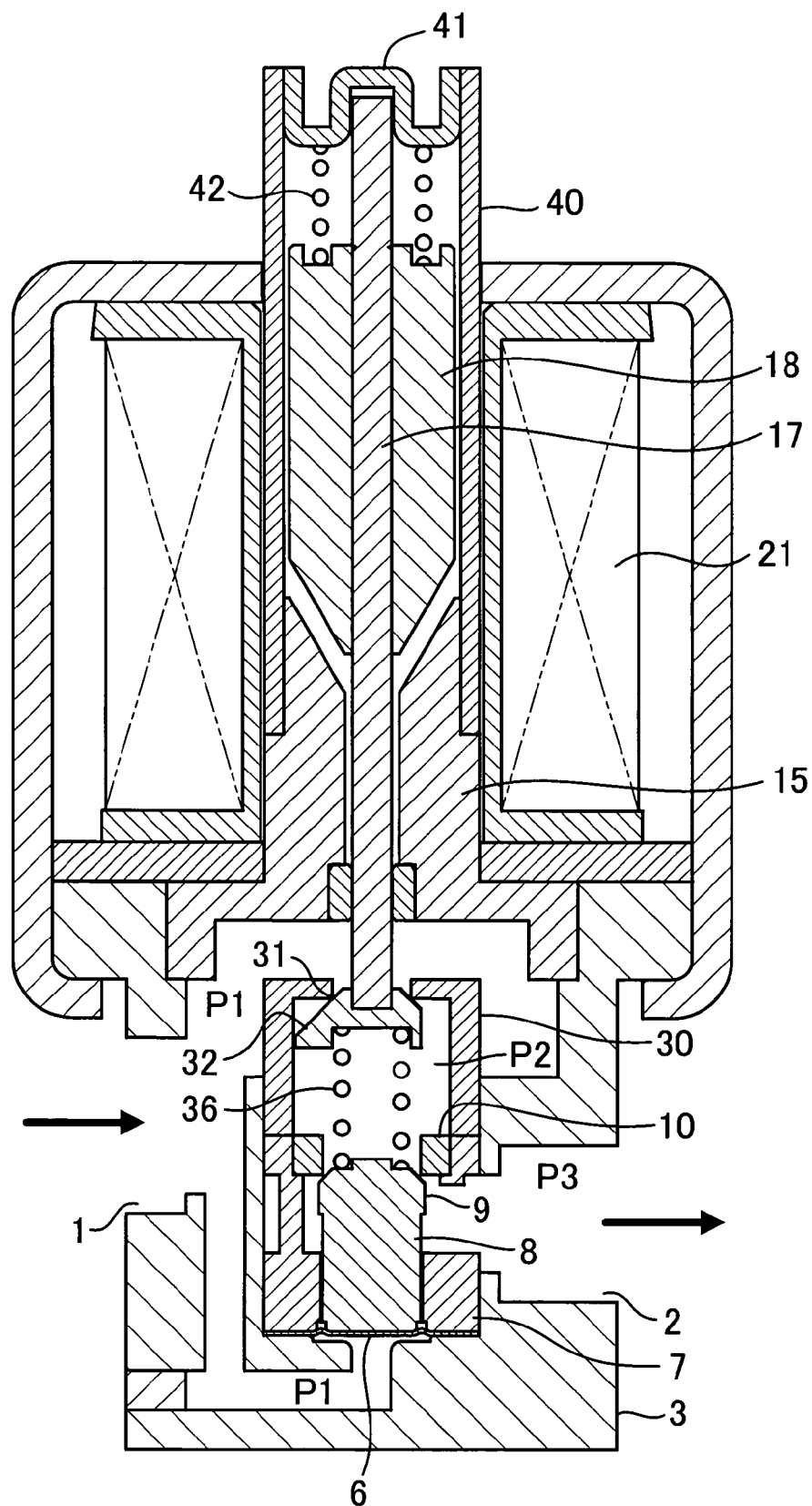
FIG. 8 is a central longitudinal cross-sectional view showing a constant flow rate expansion valve according to a fifth embodiment of the invention.

FIG. 8 is a central longitudinal cross-sectional view showing a constant flow rate expansion valve according to a fifth embodiment of the invention. It should be noted that in FIG. 8, component elements identical to or equivalent to those shown in FIG. 6 are designated by identical reference numerals, and detailed description thereof is omitted.

The constant flow rate expansion valve according to the fifth embodiment has quite the same valve section as that of the constant flow rate expansion valve according to the fourth embodiment, but the construction of its solenoid section is modified such that the load of a spring 36 of the valve section can be adjusted.

More specifically, a sleeve 40 is fit in an upper portion of a fixed core 15 of the solenoid section and welded to the same, with an upper opening of the sleeve 40 having a press-fit member 41 press-fit therein which also plays the role of a bearing for a shaft 17. Between the press-fit member 41 and a movable core 18 is disposed a spring 42, which is provided in a manner opposed to the spring 36 disposed between a flow path cross-sectional area control valve element 32 and a valve element 9. Therefore, by adjusting the amount of insertion of the press-fit member 41 into the sleeve 40 to thereby adjust the load of the spring 42, it is possible to adjust the load of the spring 36 of the valve section. This makes it possible to adjust the value of the differential pressure at which the constant flow rate expansion valve starts constant flow rate control.

It should be noted that the press-fit member 41, after the amount of insertion thereof has been adjusted, is welded to the sleeve 40 to thereby provide a gastight seal for the inside of the solenoid section. Similarly, gastight seals by welding are also provided for a portion connecting the sleeve 40 and the fixed core 15, and a portion connecting the fixed core 15 and a main block 3.

Figure 9:
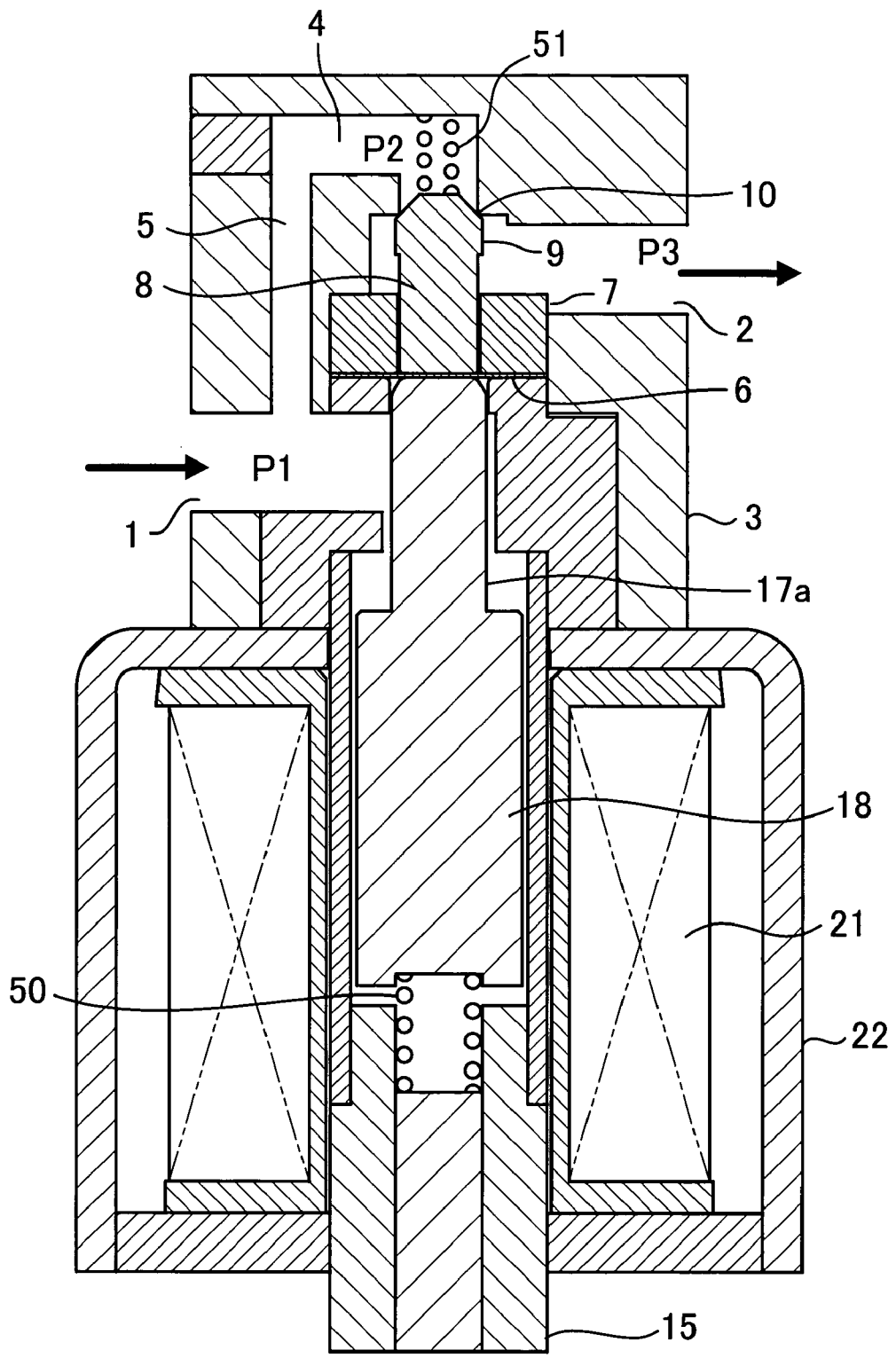
FIG. 9 is a central longitudinal cross-sectional view showing a constant flow rate expansion valve according to a sixth embodiment of the invention.

FIG. 9 is a central longitudinal cross-sectional view showing a constant flow rate expansion valve according to a sixth embodiment of the invention. It should be noted that in FIG. 9, component elements identical to or equivalent to those shown in FIG. 1 are designated by identical reference numerals, and detailed description thereof is omitted.

Similarly to the constant flow rate expansion valves according to the first and second embodiments, the constant flow rate expansion valve according to the sixth embodiment has a constant flow rate mechanism which includes a refrigerant passage 5 having a fixed flow path cross-sectional area and operates to set the differential pressure across the refrigerant passage 5 depending on the value of an electric current i supplied to a solenoid coil 21. In the sixth embodiment, however, a solenoid for setting the differential pressure is disposed on a side of the constant flow rate expansion valve opposite to a side thereof where the solenoid is disposed in the case of the constant flow rate expansion valves according to the first and second embodiments.

More specifically, the solenoid is disposed on a side where a diaphragm 6 receives a pressure P1 from a refrigerant inlet. The solenoid has a movable core 18, a spring 50, and a fixed core 15 arranged therein in the mentioned order from the side of the diaphragm 6. Further, a spring 51 is provided for urging a valve element 9 downward. The urging force of the spring 51 is smaller than that of the spring 50.

When the electric current i supplied to the solenoid coil 21 is zero, the spring 50 urges a piston 8 and the valve element 9 integrally formed with each other, via a shaft 17a integrally formed with the movable core 18, and the diaphragm 6. This causes the valve element 9 to be seated on a valve seat 10 associated therewith to fully close the constant flow rate expansion valve.

Now, if the electric current i is supplied to the solenoid coil 21, the movable core 18 is attracted toward the fixed core 15, whereby the urging force of the spring 50 is reduced, so that the shaft 17a is withdrawn to a position where the attractive force of the solenoid and the load of the spring 50 are balanced, and made stationary thereat. This enables the valve element 9 to move away from the valve seat 10 by the amount of withdrawal of the shaft 17a. Now, since the urging force of the spring 51 is applied in a direction opposite to the direction of application of the urging force of the spring 50, it is possible to move the valve element 9 away from the valve seat 10 with a smaller amount of electric current i.

In this state, when high-pressure refrigerant is introduced into the refrigerant inlet 1, then, the refrigerant enters an intermediate chamber 4 through a refrigerant passage 5, and pushes open the valve element 9 to flow out to a refrigerant outlet 2. Then, after the flow rate of the refrigerant increases to reach a predetermined flow rate, when the flow rate attempts to further increase, the differential pressure (P1−P2) is increased to move the valve element 9 in the valve-closing direction, whereas when the flow rate becomes lower than the predetermined flow rate, the differential pressure (P1−P2) is decreased to move the valve element 9 in the valve-opening direction. Thus, the constant flow rate expansion valve is maintained such that it causes refrigerant to flow at a constant flow rate set depending on the electric current i supplied to the solenoid coil 21.

Figure 10:
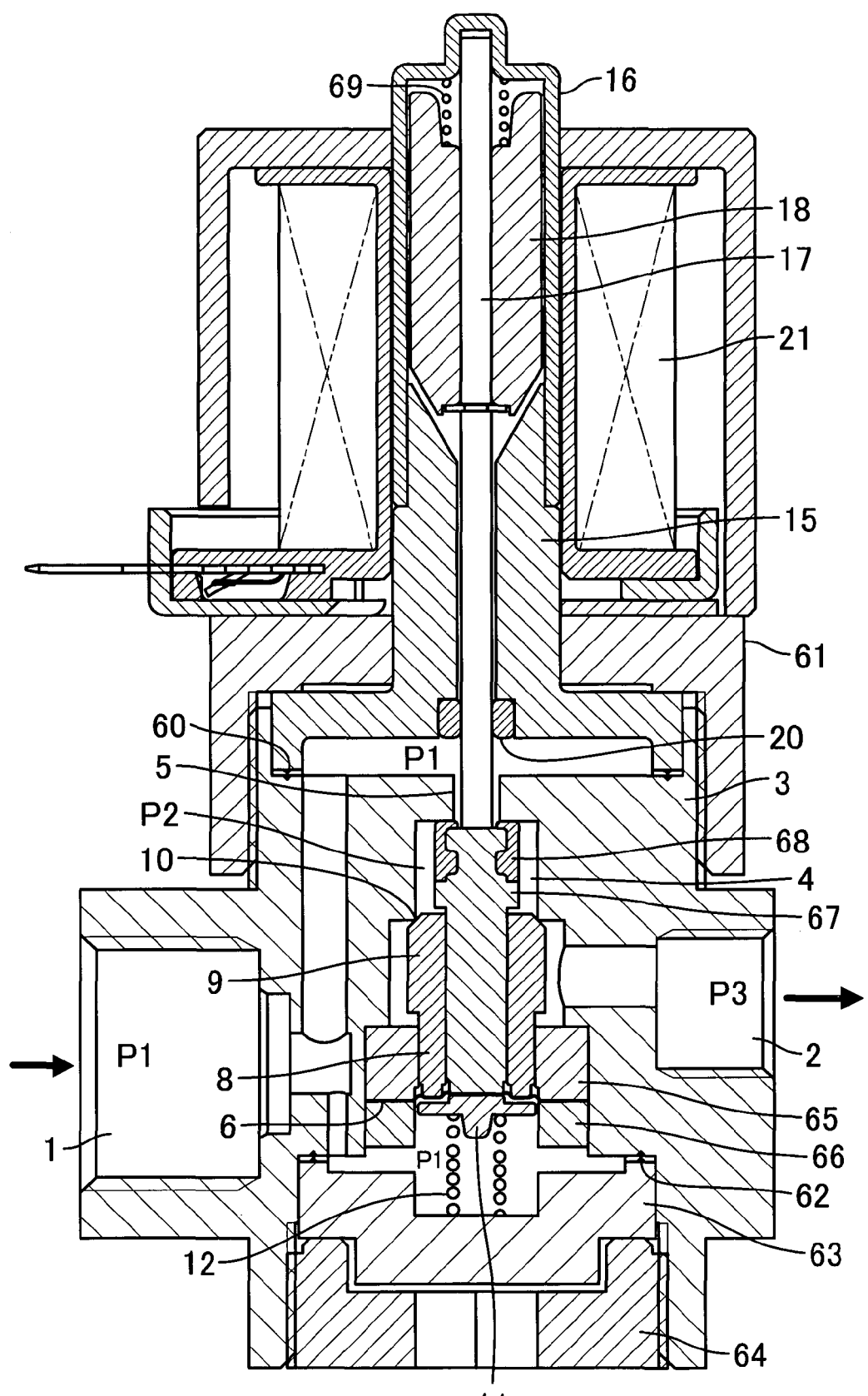
FIG. 10 is a central longitudinal cross-sectional view showing the deenergized state of a constant flow rate expansion valve according to a seventh embodiment of the invention.
Figure 11:
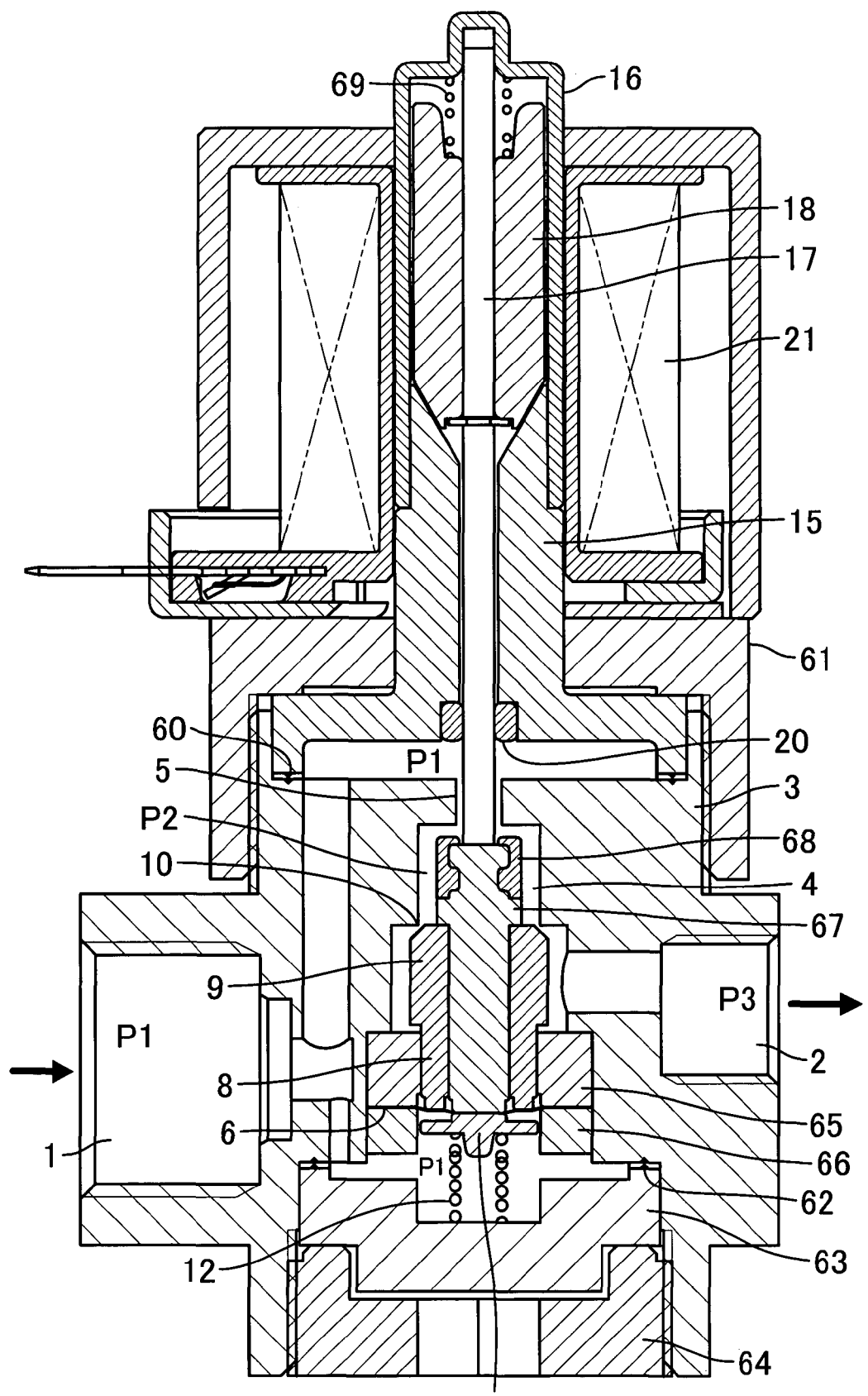
FIG. 11 is a central longitudinal cross-sectional view showing the energized state of the constant flow rate expansion valve according to the seventh embodiment of the invention.

FIG. 10 is a central longitudinal cross-sectional view showing the deenergized state of a constant flow rate expansion valve according to a seventh embodiment of the invention. FIG. 11 is a central longitudinal cross-sectional view showing the energized state of the constant flow rate expansion valve according to the seventh embodiment of the invention. It should be noted that in FIGS. 10 and 11, component elements identical to or equivalent to those shown in FIG. 1 are designated by identical reference numerals, and detailed description thereof is omitted.

Although the constant flow rate expansion valve according to the seventh embodiment is similar to the constant flow rate expansion valve according to the first embodiment in that it has a refrigerant passage 5 having a smaller flow path cross-sectional area than that of a refrigerant inlet 1 to form a restriction, and a differential pressure control valve for providing control such that the differential pressure across the refrigerant passage 5 is made constant, and sets the differential pressure depending on the value of an electric current i supplied to a solenoid coil 21, it is distinguished from the same in that the flow path cross-sectional area of the refrigerant passage 5 is changed according to the pressure of the refrigerant inlet 1, and the refrigerant passage 5 is completely closed when a solenoid is deenergized, thereby fully closing the constant flow rate expansion valve.

More specifically, in the constant flow rate expansion valve, the refrigerant passage 5 is formed through the center of the top of a main block 3, and a shaft 17 of the solenoid is disposed in a manner extending through the refrigerant passage 5, with a gap between an inner wall of the refrigerant passage 5 and the shaft 17 forming the restriction having a smaller flow path cross-sectional area than that of the refrigerant inlet 1. A fixed core 15 of the solenoid is disposed on the top of the main block 3 via a gasket 60 to form a chamber communicating with the refrigerant inlet 1 to have the same pressure as the pressure P1 of the refrigerant inlet 1. The fixed core 15 is fixed to the main block 3 by a flange 61 screwed on the main block 3. Further, a plug 63 is provided in a lower portion of the main block 3 via a gasket 62 to also form a chamber communicating with the refrigerant inlet 1 to have the same pressure as the pressure P1 of the refrigerant inlet 1. The plug 63 is fixed to the main block 3 by a stopper 64 screwed into the main block 3.

The main block 3 has a diaphragm 6 disposed therein for sealing between the refrigerant inlet 1 and a refrigerant outlet 2, and annular holders 65, 66 press-fit therein for fixing the periphery of the diaphragm 6 by sandwiching the same therebetween. This makes it possible to completely prevent internal leakage of refrigerant between the refrigerant inlet 1 and the refrigerant outlet 2. In the holder 66 on the underside of the diaphragm 6 is disposed a diaphragm-receiving disc 11 which has a protruding portion at a surface thereof in contact with the diaphragm 6, which protrudes from a central portion of the diaphragm-receiving disc 11, and makes a central portion of the diaphragm 6 be urged by a spring 12.

A piston 8 and a valve element 9 integrally formed with each other have a through hole extending in the direction of the axis thereof for axially movably holding a piston 67. The piston 67 consists of a guide portion having the same axial length as that of the piston 8 and the valve element 9, and a valve element portion having a larger diameter than that of the guide portion. The shaft 17 of the solenoid is in abutment with the top surface of the valve element portion. When receiving a solenoid force from the shaft 17, a stepped portion formed at a boundary between the guide portion and valve element portion of the piston 67 is caught by the valve element 9 to cause the piston 67, the piston 8, and the valve element 9 to operate in unison. Further, when the piston 67, the piston 8, and the valve element 9 operate in unison in the valve-closing direction, first, the valve element 9 is seated on a valve seat 10 associated therewith, and then the protruding portion at the central portion of the diaphragm-receiving disc 11 further presses the central portion of the diaphragm 6 by the urging force of the spring 12, whereby only the piston 67 is moved toward the refrigerant passage 5. The valve element portion of the piston 67 is covered with a valve sheet 68 except for part thereof in contact with the shaft 17. The valve sheet 68 is made of an elastic member, such as a rubber part.

The solenoid has a spring 69 disposed between a movable core 18 and a casing 16 so as to prevent the motion of the movable core 18 from becoming uncontrolled within the casing 16 due to external vibrations.

In the constant flow rate expansion valve constructed as above, as shown in FIG. 10, when the solenoid coil 21 is not supplied with an electric current, the spring 69 within the solenoid urges the shaft 17 downward, as viewed in the figure, with small load, while the spring 12 urges the piston 8 and the valve element 9 upward, as viewed in the figure, with large load via the diaphragm-receiving disc 11 and the diaphragm 6. This causes the valve element 9 to be seated on the valve seat 10, and further the diaphragm-receiving disc 11 to urge the piston 67 provided in the piston 8 and the valve element 9 via the diaphragm 6 by the central protruding portion thereof, whereby the piston 67 is further pushed upward, as viewed in the figure, to bring the valve sheet 68 into intimate contact with an outlet-side opening of the refrigerant passage 5. At this time, although valve-closing capability has conventionally been influenced by machining accuracy since the closed state in which the valve element 9 is seated on the valve seat 10 has been effected by mutual contact of metal members, the refrigerant passage 5 is closed by using the valve sheet 68 having elasticity, which makes it possible to maintain a substantially completely closed state of the valve.

According to the above constant flow rate expansion valve, since it is possible to hold a completely closed state of the valve, piping between the condenser and the evaporator can be blocked. Therefore, even when the constant flow rate expansion valve is applied to a refrigeration cycle which uses, as refrigerant, HFC-152a, which is combustible, among fluorohydrocarbon refrigerants, or carbon dioxide having a very high operating pressure, and there occurs an accident, such as a breakage of an evaporator provided in a vehicle compartment during stoppage of operation of an automotive air conditioner, the refrigerant within the refrigeration cycle is prevented from leaking via the evaporator into the vehicle compartment. Occurrence of a fire and suffocation due to oxygen deficiency, which can seriously injure occupants, can be prevented. In this case, if a check valve is provided on an outlet side of the evaporator, and the automotive air conditioner is operated such that when the operation of the air conditioner is stopped, the constant flow rate expansion valve is fully closed, and then a compressor is continuously operated to suck refrigerant from the evaporator, whereafter the compressor is stopped, it is possible to collect the refrigerant from the evaporator, thereby making it possible to further completely prevent leakage of refrigerant into the vehicle compartment.

Next, as shown in FIG. 11, when the solenoid coil 21 is supplied with the electric current i, the movable core 18 is attracted by the fixed core 15, whereby a corresponding solenoid force is applied to the piston 67 to push the piston 67 downward, as viewed in the figure, thereby opening the refrigerant passage 5 first. After that, since the stepped portion is caught by the valve element 9, the piston 67 moves downward, as viewed in the figure, against the load of the spring 12, in unison with the valve element 9 and the piston 8, and the valve element 9 is made stationary in a position where the solenoid force and the load of the spring 12 are balanced. In this state, when high-pressure refrigerant is introduced into the refrigerant inlet 1, the refrigerant is reduced in pressure when it passes through the refrigerant passage 5 forming the restriction, and then enters an intermediate chamber 4 having an intermediate pressure P2. From the intermediate chamber 4, the refrigerant flows into the refrigerant outlet 2 while being adiabatically expanded through a gap formed between the valve element 9 and the valve seat 10. By the flow of the refrigerant, a differential pressure (P1–P2) is generated across the refrigerant passage 5. This differential pressure (P1–P2) increases as the flow rate of the refrigerant increases. When the flow rate of the refrigerant attempts to exceed a certain flow rate set by the solenoid, the differential pressure (P1–P2) increases to cause the diaphragm 6 to urge the valve element 9 toward the valve seat 10 in the direction of reducing the flow rate of the refrigerant. Inversely, when the flow rate becomes smaller than the certain flow rate, the differential pressure (P1–P2)

is also made smaller, so that the differential pressure (P1−P2) acts on the valve element 9 to urge the same in the valve-opening direction to increase the flow rate. As a result, the constant flow rate expansion valve is capable of causing refrigerant to flow at a constant flow rate set according to the electric current i supplied to the solenoid coil 21.

Further, in the constant flow rate expansion valve, when the valve element 9 of the differential pressure control valve controls the flow rate of the refrigerant such that the differential pressure (P1−P2) across the refrigerant passage 5 is held constant, the piston 67 extending from the valve element 9 to a location close to the outlet of the refrigerant passage 5 is also moved in unison with the valve element 9, thereby varying the flow path cross-sectional area of the refrigerant passage 5. This acts to narrow the flow path cross-sectional area when the pressure P1 of the refrigerant inlet 1 increases, and widen the same when the pressure P1 decreases. Therefore, although density of the refrigerant is increased by an increase in the pressure P1 of the refrigerant inlet 1, the flow path cross-sectional area of the refrigerant passage 5 is narrowed to reduce the volumetric flow rate of the refrigerant, so that the piston 67 acts to hold constant the mass flow rate of the refrigerant passing through the refrigerant passage 5. Inversely, when the pressure P1 of the refrigerant inlet 1 decreases, the volumetric flow rate of the refrigerant is increased so as not to change the mass flow rate thereof. As a result, even if the pressure P1 of the refrigerant inlet 1 is changed, the mass flow rate of the refrigerant remains unchanged. Therefore, it is possible to make the constant flow rate expansion valve unsusceptible to changes in the pressure of the refrigerant inlet 1 and excellent in controllability.

As described heretofore, according to the present invention, the constant flow rate expansion valve is configured to have a diaphragm disposed at a portion of a differential pressure control valve, where a pressure from a refrigerant inlet is received, thereby blocking a gap at a sliding portion of the differential pressure control valve. This makes it possible to completely prevent leakage of refrigerant via the sliding portion, so that the leakage of refrigerant is reduced to an amount depending on a degree of gastightness between a valve element and a valve seat of the differential pressure control valve in a fully-closed state thereof.

Further, the constant flow rate expansion valve is configured such that the valve element of the differential pressure control valve is formed by two component parts, and when the flow rate of refrigerant is controlled, while operating the two valve elements in unison to vary the flow path cross-sectional area of a restriction for generating a differential pressure, the differential pressure across the restriction is made constant, and that after one of the valve elements has fully closed the differential pressure control valve, the other valve element, which is made of an elastic member, is further urged to fully close the restriction. Since the flow path cross-sectional area of the restriction is made variable, the mass flow rate of refrigerant passing through the restriction is stabilized, which makes the constant flow rate expansion valve unsusceptible to changes in the pressure of a refrigerant inlet, thereby making it possible to enhance controllability of the expansion valve. Further, since the restriction is completely sealed when it is fully closed, leakage of refrigerant can be completely prevented to thereby enhance quality of the expansion valve.

In the embodiments of the constant flow rate expansion valve according to the invention, gastight seals are provided for the portion connecting the fixed core and the main block, and so forth, by welding, without using sealing members, such as O rings and gaskets. Therefore, the constant flow rate expansion valve is by far enhanced in pressure resistance. This makes it unnecessary for the constant flow rate expansion valve according to the invention to have a complicated construction, such as that of a pilot-operated expansion valve, not only when it is used in a refrigeration cycle using fluorohydrocarbon refrigerant (HFC-134a, HFC-152a) but also when it is used in a refrigeration cycle using carbon dioxide having a very high operating pressure.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A constant flow rate expansion valve including a restriction having a flow path cross-sectional area smaller than that of a refrigerant inlet, and a differential pressure control valve for providing control such that a differential pressure across the restriction is constant, characterized in that a downstream side of the restriction and an upstream side of the differential pressure control valve are communicated with each other, and that the differential pressure control valve is configured to receive an inlet pressure of the refrigerant inlet in a valve-closing direction and at the same time receive an intermediate pressure between the restriction and the differential pressure control valve in a valve-opening direction, with a pressure-receiving portion for receiving the inlet pressure being fluidly isolated by a diaphragm.

2. The constant flow rate expansion valve according to claim 1, wherein the differential pressure control valve includes a valve seat disposed at an intermediate portion of a passage leading from a space between the restriction and the differential pressure control valve to a refrigerant outlet, a valve element disposed in a manner opposed to the valve seat from a side of the refrigerant outlet such that the valve element can move to and away from the valve seat, and a piston integrally formed with the valve element, and wherein the diaphragm is provided on an opposite end face of the piston to the valve element, in abutment with the end face.

3. The constant flow rate expansion valve according to claim 1, wherein the diaphragm is formed by a plurality of thin films overlaid upon each other.

4. The constant flow rate expansion valve according to claim 1, wherein the restriction is a refrigerant passage having a fixed flow path cross-sectional area, and wherein the differential pressure control valve is configured such that a solenoid is disposed on a side of the differential pressure control valve where the inlet pressure is received, and the differential pressure control valve is urged via the diaphragm in the valve-closing direction by a spring interposed between a fixed core and a movable core of the solenoid, and that a differential pressure set to the differential pressure control valve can be varied by reducing an urging force of the spring depending on a value of an electric current supplied to the solenoid for energization thereof.

5. The constant flow rate expansion valve according to claim 4, wherein the differential pressure control valve includes a valve element having a frustoconical shape.

6. The constant flow rate expansion valve according to claim 4, wherein the differential pressure control valve includes a valve element having a flat seating surface.

7. The constant flow rate expansion valve according to claim 1, wherein the restriction is configured such that the restriction includes a first valve seat disposed in a passage between the refrigerant inlet and the differential pressure control valve, a first valve element disposed in a manner opposed to the first valve seat from a side of the differential pressure control valve such that the first valve element can move to and away from the first valve seat, and a first spring for urging the first valve element toward the first valve seat in the valve-closing direction, and that the first valve element is urged by a solenoid in the valve-opening direction, thereby making it possible to vary a flow path cross-sectional area set to the restriction depending on a value of an electric current supplied to the solenoid for energization thereof, wherein the differential pressure control valve includes a second valve seat disposed at an intermediate portion of a passage leading from the restriction to a refrigerant outlet, a second valve element disposed in a manner opposed to the second valve seat from a side of the refrigerant outlet such that the second valve element can move to and away from the second valve seat, a piston integrally formed with the second valve element, and a second spring for urging the second valve element in the valve-opening direction, the diaphragm being provided on an opposite end face of the piston to the second valve element, in abutment with the end face.

8. The constant flow rate expansion valve according to claim 7, wherein assuming that an effective pressure-receiving area of the first valve element is represented by A, a load set to the first spring is represented by f1, an effective pressure-receiving area of the second valve element is represented by B, and a load set to the second spring is represented by f2, the first valve element, the first spring, the second valve element, and the second spring are set to have a relationship of $f1/A > f2/B$.

9. The constant flow rate expansion valve according to claim 1, wherein the restriction is configured such that the restriction includes a first valve seat disposed in a passage between the refrigerant inlet and the differential pressure control valve, a first valve element disposed in a manner opposed to the first valve seat from a side of the differential pressure control valve such that the first valve element can move to and away from the first valve seat, and a spring for urging the first valve element toward the first valve seat in the valve-closing direction, and that the first valve element is urged by a solenoid in the valve-opening direction, thereby making it possible to vary a flow path cross-sectional area set to the restriction depending on a value of an electric current supplied to the solenoid for energization thereof, and wherein the differential pressure control valve includes a second valve seat disposed at an intermediate portion of a passage leading from the restriction to a refrigerant outlet, a second valve element disposed in a manner opposed to the second valve seat from a side of the refrigerant outlet such that the second valve element can move to and away from the second valve seat, and a piston integrally formed with the second valve element, the second valve element being urged by the spring in the valve-opening direction, the diaphragm being provided on an opposite end face of the piston to the second valve element, in abutment with the end face.

10. The constant flow rate expansion valve according to claim 9, wherein the solenoid includes a second spring disposed in a manner urging a movable core toward a fixed core and the first valve element, a load of the spring urging the first valve element and the second valve element being indirectly adjusted by adjusting a load of the second spring.

11. The constant flow rate expansion valve according to claim 10, wherein the load of the second spring is adjusted based on an amount of insertion of a press-fit member receiving the second spring on a side opposite to the movable core.

12. The constant flow rate expansion valve according to claim 1, including an elastic valve element disposed for opening and closing the restriction, thereby being capable of completely closing a passage between the refrigerant inlet and a refrigerant outlet.

13. The constant flow rate expansion valve according to claim 1, wherein the restriction is formed by a refrigerant passage formed between the refrigerant inlet and the differential pressure control valve and having a shaft of a solenoid extending therethrough, the solenoid setting a differential pressure across the differential pressure control valve depending on a value of an electric current supplied thereto for energization thereof, and wherein the differential pressure control valve includes a valve seat disposed at an intermediate portion of a passage leading from the restriction to a refrigerant outlet, a valve element disposed in a manner opposed to the valve seat from a side of the refrigerant outlet such that the valve element can move to and away from the valve seat, a piston axially movably held in a through hole coaxially formed through the valve element, and having the shaft in abutment with one end face thereof having an outer diameter larger than an inner diameter of the refrigerant passage, the piston having the valve element and the diaphragm in abutment with the other end face thereof, and a spring for urging the piston via the diaphragm in a direction in which the valve element is seated on the valve seat, the piston operating in unison with the valve element when the solenoid is in an energized state, whereas when the solenoid is in a deenergized state, the piston operating even after the valve element has been seated on the valve seat, to close the refrigerant passage.

14. The constant flow rate expansion valve according to claim 13, wherein the piston has an elastic member provided at a portion thereof for closing the refrigerant passage.

15. The constant flow rate expansion valve according to claim 14, wherein the elastic member is a rubber part.

16. The constant flow rate expansion valve according to claim 13, wherein the piston has a stepped portion for catching the valve element to cause the piston to operate in unison therewith, after opening the refrigerant passage by receiving an urging force from the solenoid.

17. The constant flow rate expansion valve according to claim 1, wherein the restriction is a refrigerant passage formed between the refrigerant inlet and the differential pressure control valve and having a fixed flow path cross-sectional area, wherein the differential pressure control valve includes a valve seat disposed at an intermediate portion of a passage leading from a space between the restriction and the differential pressure control valve to a refrigerant outlet, and a valve element disposed in a maimer opposed to the valve seat from a side of the refrigerant outlet such that the valve element can move to and away from the valve seat, the valve element being urged by a spring via the diaphragm in the valve closing direction from a side of the differential pressure control valve where the inlet pressure is received, and for being urged by a solenoid in the valve-opening direction from a side of the differential pressure control valve where the intermediate pressure is received, the valve element having an extended portion extending through a valve hole to a location close to an outlet of the refrigerant passage, the extended portion controlling a flow path cross-sectional area at the outlet of the refrigerant passage according to changes in pressure of the refrigerant inlet.

18. The constant flow rate expansion valve according to claim 1, applied to a refrigeration cycle using carbon dioxide as refrigerant.

19. The constant flow rate expansion valve according to claim 1, applied to a refrigeration cycle using HFC-152a as refrigerant.

20. A constant flow rate expansion valve including a restriction having a flow path cross-sectional area smaller than that of a refrigerant inlet, and a differential pressure control valve for providing control such that a differential pressure across the restriction is constant, characterized in that a downstream side of the restriction and an upstream side of the differential pressure control valve are communicated with each other, and that the differential pressure control valve is configured to receive an inlet pressure of the refrigerant inlet in a valve-closing direction and at the same time receive an intermediate pressure between the restriction and the differential pressure control valve in a valve-opening direction, with a pressure-receiving portion for receiving the inlet pressure being fluidly isolated by a diaphragm, wherein the differential pressure control valve includes a valve seat disposed at an intermediate portion of a passage leading from a space between the restriction and the differential pressure control valve to a refrigerant outlet, a valve element disposed in a manner opposed to the valve seat from a side of the refrigerant outlet such that the valve element can move to and away from the valve seat, and a piston integrally formed with the valve element, and wherein the diaphragm is provided on an opposite end face of the piston to the valve element, in abutment with the end face, wherein an inner diameter of the valve seat of the differential pressure control valve and an effective pressure-receiving area of the diaphragm are formed to have the same size.

21. A constant flow rate expansion valve including a restriction having a flow path cross-sectional area smaller than that of a refrigerant inlet, and a differential pressure control valve for providing control such that a differential pressure across the restriction is constant, characterized in that a downstream side of the restriction and an upstream side of the differential pressure control valve are communicated with each other, and that the differential pressure control valve is configured to receive an inlet pressure of the refrigerant inlet in a valve-closing direction and at the same time receive an intermediate pressure between the restriction and the differential pressure control valve in a valve-opening direction, with a pressure-receiving portion for receiving the inlet pressure being fluidly isolated by a diaphragm, wherein the differential pressure control valve includes a valve seat disposed at an intermediate portion of a passage leading from a space between the restriction and the differential pressure control valve to a refrigerant outlet, a valve element disposed in a manner opposed to the valve seat from a side of the refrigerant outlet such that the valve element can move to and away from the valve seat, and a piston integrally formed with the valve element, and wherein the diaphragm is provided on an opposite end face of the piston to the valve element, in abutment with the end face, wherein the diaphragm is gastightly sandwiched between a holder axially movably supporting the piston, and a main block having the holder fitted therein.

22. A constant flow rate expansion valve including a restriction having a flow path cross-sectional area smaller than that of a refrigerant inlet, and a differential pressure control valve for providing control such that a differential pressure across the restriction is constant, characterized in that a downstream side of the restriction and an upstream side of the differential pressure control valve are communicated with each other, and that the differential pressure control valve is configured to receive an inlet pressure of the refrigerant inlet in a valve-closing direction and at the same time receive an intermediate pressure between the restriction and the differential pressure control valve in a valve-opening direction, with a pressure-receiving portion for receiving the inlet pressure being fluidly isolated by a diaphragm, wherein the restriction is a refrigerant passage having a fixed flow path cross-sectional area, and wherein the differential pressure control valve is configured such that a side of the differential pressure control valve where the inlet pressure is received is urged by a spring via the diaphragm in the valve-closing direction, and a side of the differential pressure control valve where the intermediate pressure is received is urged by a solenoid in the valve-opening direction, with a differential pressure set to the differential pressure control valve being made variable depending on a value of an electric current supplied to the solenoid for energization thereof.

23. The constant flow rate expansion valve according to claim 22, wherein the differential pressure control valve includes a valve element having a frustoconical shape.

24. The constant flow rate expansion valve according to claim 22, wherein the differential pressure control valve includes a valve element having a flat seating surface.

* * * * *